(12) United States Patent
Roy et al.

(10) Patent No.: US 12,192,278 B2
(45) Date of Patent: Jan. 7, 2025

(54) SYSTEMS, METHODS, AND APPARATUS FOR REMOTE DATA TRANSFERS TO MEMORY

(71) Applicant: Samsung Electronics Co., Ltd., Suwon-si (KR)

(72) Inventors: Somnath Roy, San Ramon, CA (US); Ronald Lee, Pleasanton, CA (US); Benixon Arul Dhas, Gilroy, CA (US); Xiangnan Li, Campbell, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/746,950

(22) Filed: May 17, 2022

(65) Prior Publication Data

US 2023/0044165 A1 Feb. 9, 2023

Related U.S. Application Data

(60) Provisional application No. 63/230,687, filed on Aug. 6, 2021.

(51) Int. Cl.
*H04L 67/1097* (2022.01)
*H04L 45/00* (2022.01)
(Continued)

(52) U.S. Cl.
CPC .......... *H04L 67/1097* (2013.01); *H04L 45/22* (2013.01); *H04L 45/28* (2013.01); *H04L 45/42* (2013.01); *H04L 67/06* (2013.01)

(58) Field of Classification Search
CPC ............................ H04L 67/1097; H04L 67/06
See application file for complete search history.

(56) References Cited

U.S. PATENT DOCUMENTS 5,907,676 A * 5/1999 Fujishiro ................. H04L 69/16
709/203
6,633,923 B1 * 10/2003 Kukura .................... H04L 67/10
719/316

(Continued)

OTHER PUBLICATIONS

Kalia, Anuj et al., "Using RDMA Efficiently for Key-Value Services," Proceedings of the 2014 ACM Conference on SIGCOMM, 2014, pp. 295-306.

(Continued)

*Primary Examiner* — Viet D Vu
(74) *Attorney, Agent, or Firm* — Renaissance IP Law Group LLP

(57) ABSTRACT

A method may include receiving, at a target, from a server, a command, information to identify data, and access information to perform a data transfer using a memory access protocol, and performing, based on the command, based on the access information, the data transfer between the target and a client using the memory access protocol. The information to identify the data may include an object key, and the object key and the access information may be encoded, at least partially, in an encoded object key. The method may further include sending, based on the data transfer, from the target to the server, a completion. The method may further include sending, based on the completion, from the server to the client, an indication of success. The method may further include reconstructing the data based on the parity data.

19 Claims, 11 Drawing Sheets

(51) Int. Cl.
*H04L 45/28* (2022.01)
*H04L 45/42* (2022.01)
*H04L 67/06* (2022.01)

(56) References Cited

U.S. PATENT DOCUMENTS

| | | | |
|---|---|---|---|
| 6,675,200 | B1 | 1/2004 | Cheriton et al. |
| 7,944,920 | B2 | 5/2011 | Pandya |
| 8,296,386 | B1* | 10/2012 | Micalizzi, Jr. ......... H04L 1/1835 |
| | | | 370/254 |
| 8,527,661 | B1* | 9/2013 | Lee ....................... H04L 67/568 |
| | | | 709/217 |
| 9,239,607 | B2* | 1/2016 | Wang ...................... H04L 69/22 |
| 9,300,749 | B2 | 3/2016 | Guerin et al. |
| 9,372,826 | B2 | 6/2016 | Guerin et al. |
| 9,575,927 | B2 | 2/2017 | Guerin et al. |
| 10,019,276 | B2 | 7/2018 | Tsirkin et al. |
| 10,225,344 | B2 | 3/2019 | Aslam et al. |
| 10,425,483 | B2 | 9/2019 | Crawford et al. |
| 10,496,626 | B2 | 12/2019 | Friedman et al. |
| 10,581,997 | B2 | 3/2020 | Zhu et al. |
| 10,642,779 | B2 | 5/2020 | Zhu et al. |
| 10,713,210 | B2 | 7/2020 | Shamis et al. |
| 10,956,346 | B1 | 3/2021 | Ben-Yehuda et al. |
| 10,977,193 | B2 | 4/2021 | Kimura et al. |
| 11,188,345 | B2 | 11/2021 | Chen et al. |
| 2004/0019655 | A1* | 1/2004 | Uemura .............. H04L 67/1008 |
| | | | 709/217 |
| 2004/0024786 | A1* | 2/2004 | Anderson ............... G06F 16/10 |
| 2005/0044162 | A1* | 2/2005 | Liang .................. H04L 67/1095 |
| | | | 709/212 |
| 2006/0034254 | A1* | 2/2006 | Trost ....................... H04L 67/02 |
| | | | 370/352 |
| 2006/0259661 | A1* | 11/2006 | Feng ..................... H04L 69/163 |
| | | | 710/39 |
| 2014/0226817 | A1* | 8/2014 | Von Huben ........... H04W 12/04 |
| | | | 370/254 |
| 2014/0304513 | A1 | 10/2014 | Novak et al. |
| 2015/0106468 | A1* | 4/2015 | Kobayashi ............ G06F 3/0635 |
| | | | 709/212 |
| 2017/0075828 | A1* | 3/2017 | Monji ...................... G06F 3/06 |
| 2018/0152278 | A1* | 5/2018 | Chen ..................... H04L 67/141 |
| 2019/0004701 | A1 | 1/2019 | Bernat et al. |
| 2019/0220356 | A1 | 7/2019 | Zhang et al. |
| 2020/0007169 | A1* | 1/2020 | Lamberts .............. H03M 13/35 |
| 2020/0136996 | A1 | 4/2020 | Li et al. |
| 2020/0241927 | A1 | 7/2020 | Yang et al. |
| 2021/0081401 | A1 | 3/2021 | Khatami et al. |

OTHER PUBLICATIONS

Kanevsky, Arkady et al., "Enhanced Remote Direct Memory Access (RDMA) Connection Establishment," Internet Engineering Task Force (IETF), Standards Track, 2012, 25 pages.

European Extended Search Report for Application No. 22187416.7, mailed Dec. 16, 2022.

European Office Action for Application No. 22187416.7, mailed Oct. 30, 2024.

* cited by examiner

SYSTEMS, METHODS, AND APPARATUS FOR REMOTE DATA TRANSFERS TO MEMORY

REFERENCE TO RELATED APPLICATION

This application claims priority to, and the benefit of, U.S. Provisional Patent Application Ser. No. 63/230,687 filed Aug. 6, 2021 which is incorporated by reference.

TECHNICAL FIELD

This disclosure relates generally to data transfers, and more specifically to systems, methods, and apparatus for remote data transfers to memory.

BACKGROUND

A client may send a request to a server to read data from one or more storage resources that may be controlled by the server. The server may send a command to the one or more storage resources to retrieve the data. The one or more storage resources may transfer the data to the server, and the server may transfer the data to the client.

The above information disclosed in this Background section is only for enhancement of understanding of the background of the invention and therefore it may contain information that does not constitute prior art.

SUMMARY

A method may include receiving, at a target, from a server, a command, information to identify data, and access information to perform a data transfer using a memory access protocol, and performing, based on the command, based on the access information, the data transfer between the target and a client using the memory access protocol. The information to identify the data may include an object key, and the object key and the access information may be encoded, at least partially, in an encoded object key. The method may further include sending, based on the data transfer, from the target to the server, a completion. The method may further include sending, based on the completion, from the server to the client, an indication of success. The target may be a first target, the command may be a first command, the information to identify data may be first information to identify first data, the access information may be first access information, and the data transfer may be a first data transfer, and the method may further include receiving, at the target, from the server, a second command, second information to identify second data, and second access information to perform a second data transfer using the memory access protocol, obtaining, based on the second information to identify the second data, the second data, and performing, based on the second command, based on the second access information, the second data transfer between the target and the client using the memory access protocol. The method may further include sending, based on the first data transfer, from the target to the server, a first completion, sending, based on the second data transfer, from the target to the server, a second completion, and sending, based on the first completion and the second completion, from the server to the client, an indication of success. The data may be configured for error correction. The data may be erasure coded. The data transfer may be a first data transfer, and the target may be one of one or more targets, and the method may further include determining a status of the first data transfer, and performing a second data transfer, based on the status, between the client and one of the one or more targets, of parity data using the memory access protocol. The method may further include reconstructing the data based on the parity data. The reconstructing may be performed at the client. The method may further include initializing a connection, between the client and the target, for the memory access protocol. The method may further include sending, from the server to the client, configuration information for the target, wherein the connection may be based on the configuration information. The performing the data transfer may include transferring the data from the target to the client. The performing the data transfer may include transferring the data from the client to the target. The method may further include receiving, at the target, a request to access one or more resources controlled by the server, wherein the target may be configured to provide access to at least one of the one or more resources. The one or more resources may include one or more of a storage resource or a compute resource. The one or more resources may include a key-value store. The server may include an object storage server.

A system may include a target configured to receive, using a first network path, a command, and perform, based on the command, using a second network path, using a memory access protocol, a transfer of data. The transfer of data may include a transfer of data from the target to a client. The transfer of data may include a transfer of data from a client to the target. The system may further include a server configured to receive, using a third network path, a request, and send, to the target, based on the request, using the first network path, the command. The system may further include a client configured to send, to the server, using the third network path, the request, and perform, using the second network path, using the memory access protocol, the transfer of data. The server may be configured to receive the request using a network stack for the third network path. The target may be configured to send, to the server, using the first network path, a completion based on the transfer. The server may be configured to send, to the client, using the third network path, an indication of success based on the completion. The command may be a first command, the transfer may be a first transfer, the target may be one of one or more targets, the first network path may be one of one or more first network paths, the second network path may be one of one or more second network paths, and the system may further include a server configured to determine a status of the first transfer, and send, to one of the one or more targets, based on the status, using one of the one or more first network paths, a second command, wherein the second command may be to perform, using one of the second network paths, a second transfer, between a client and one of the one or more targets, of parity data using the memory access protocol.

An apparatus may include a target interface, and one or more network interfaces configured to connect the target interface to a first network path and a second network path, wherein the target interface may be configured to receive, using the first network path, a command, and perform a transfer, based on the command, using the second network path, using a memory access protocol. The target interface may be configured to send, based on the transfer, using the first network path, a completion. The target interface may be configured to initialize a connection for the memory access protocol for the second network path. The apparatus may further include one or more resources, wherein the target interface may be configured to provide access, using the second network path, using the memory access protocol, to the one or more resources. The one or more resources may include a storage device. The one or more resources may include an accelerator. The one or more resources may include a key-value store. The target interface may include a Nonvolatile Memory Express (NVMe) interface.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 9 illustrates an embodiment of a method for remote data transfer to memory using a memory access protocol in accordance with example embodiments of the disclosure. The

DETAILED DESCRIPTION

Figure 1:
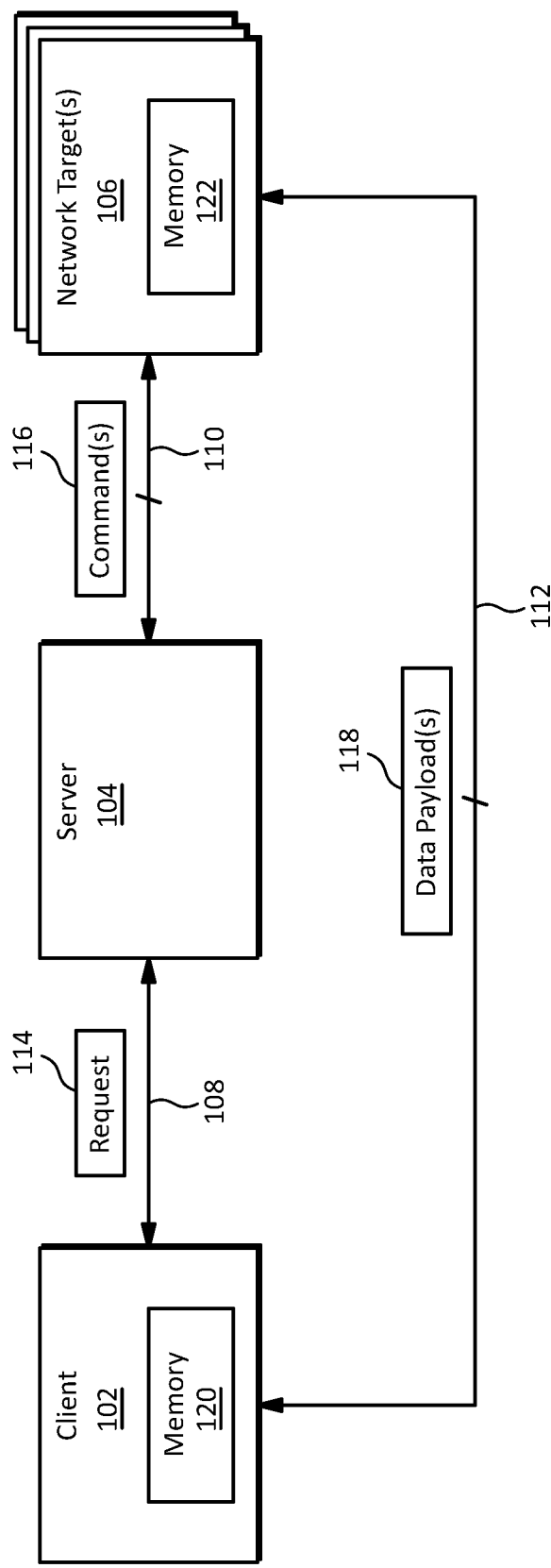
FIG. 1 illustrates an embodiment of a data transfer scheme in accordance with example embodiments of the disclosure.

A data processing system may include a client that may access one or more resources such as storage devices, accelerators, and/or the like, that may be controlled by a server. The server may be connected to the one or more resources through a back-end network that may use a protocol having relatively low overhead and/or latency such as Remote Direct Memory Access (RDMA). However, the server may be connected to the client through a front-end network that may use a network stack having one or more protocols with relatively high overhead and/or latency such as Hypertext Transfer Protocol (HTTP) and/or Transmission Control Protocol (TCP). Thus, when the client sends a request for data to the server, the data may be transferred from the one or more resources to the server with relatively low overhead and/or latency, but the data may be transferred from the server to the client with relatively high overhead and/or latency. Depending on the implementation details, this may create a bottleneck that may impair the ability of the client to process the requested data.

In a data transfer scheme in accordance with example embodiments of the disclosure, a client may request data from one or more resources controlled by a server by sending a request to the server. Based on receiving the request, the server may send a command to one or more network targets instructing the one or more network targets to retrieve the requested data from the one or more resources. However, rather than sending the data payload to the server, the one or more network targets may send the data payload to the client. For example, in some embodiments, the one or more network targets may send the data payload to one or more memory locations of the client using one or more network paths and/or protocols that may have relatively low overhead and/or latency. Depending on the implementation details, this may improve the ability of the client to process the requested data.

In some embodiments, a data transfer scheme may implement one or more data protection techniques. For example, in some embodiments, upon completion of one or more data transfers to a client memory, the one or more network targets may send one or more corresponding completions to the server. Based on the completions, the server may send an indication of success or failure to the client.

As another example of data protection, in some embodiments, an error correction technique (e.g., erasure coding) may be implemented in which a data payload may be divided into one or more portions (which may also be referred to as chunks) that may be sent from one or more network targets to the client in separate transmissions. Parity information may be generated for, and/or stored with, the data chunks. If one or more of the data chunks is not transferred successfully to the client memory (e.g., one or more of the data chunks is missing), some or all of the parity information may be retrieved and/or transferred from the one or more network targets to the client memory, for example, using the one or more network paths and/or protocols that may have relatively low overhead and/or latency. Using some or all of the parity information, the client may reconstruct the one or more missing data chunks.

In some embodiments, one or more of the features, functions, operations, and/or the like, relating to a data transfer scheme may be hidden from an application running on a client. For example, in some embodiments, a client interface may perform one or more operations such as initializing one or more network connections between the client and one or more network targets, sending a command to a server to request and/or send data to one or more resources controlled by the server, performing one or more data protection operations such as checksum verification, data reconstruction and/or the like. In some embodiments, a client interface may be implemented, for example, with one or more wrappers, libraries (e.g., helper libraries), application programming interfaces (APIs), device drivers, function calls, system calls, and/or the like, or a combination thereof.

The principles disclosed herein have independent utility and may be embodied individually, and not every embodiment may utilize every principle. However, the principles may also be embodied in various combinations, some of which may amplify the benefits of the individual principles in a synergistic manner.

FIG. 1 illustrates an embodiment of a data transfer scheme in accordance with example embodiments of the disclosure. The scheme illustrated in FIG. 1 may include a client 102, a server 104, and one or more targets 106. The server 104 may be connected to the client 102 through a first network path 108. The server 104 may be connected to the one or more targets 106 through one or more second network paths 110. The one or more targets 106 may be connected to the client 102 through one or more third network paths 112.

In some embodiments, the server 104 may be configured to receive a request 114 from the client 102 through the first network path 108 to access one or more resources controlled by the server 104. One example of resources may include storage resources such as individual storage devices, collections of storage resources, object (e.g., key-value) stores, and/or the like. In embodiments in which the one or more resources include storage resources, the server 104 may be configured, at least in part, as a storage server, e.g., an object storage server. Another example of resources may include compute resources such as accelerators, graphics processing units (GPUs), neural processing units (NPUs), tensor processing units (TPUs), and/or the like. In embodiments in which the one or more resources include compute resources, the server 104 may be configured, at least in part, as a compute server.

In some embodiments, the server 104 may be configured to send, in response to the request 114, one or more commands 116 to the one or more network targets 106 through the one or more second network paths 110. The one or more network targets 106 may be arranged to provide access to the one or more resources based on the one or more commands 116. For example, one or more of the network targets 106 may be connected to one or more resources (e.g., storage resources, compute resources, and/or the like) through one or more interconnects, network paths, and/or the like.

In some embodiments, the client 102 may include a client memory 120 (which may also be referred to as a client buffer) and/or the one or more network targets 106 may include one or more target memories 122 (which may also be referred to as target buffers). The one or more network targets 106 may be configured to transfer, in response to the one or more commands 116, one or more data payloads 118 between the client memory 120 and the one or more target memories 122. For example, if the request 114 is a put request, data may be transferred from the client memory 120 to the one or more target memories 122. As another example, if the request 114 is a get request, data may be transferred from the one or more target memories 122 to the client memory 120.

In some embodiments, a transfer of one or more data payloads from the client 102 to one or more memories of the one or more network targets 106, or from one or more network targets 106 to a memory of the client 102, may be referred to as a remote data transfer to memory. In some embodiments, a remote data transfer to memory may be performed using a memory access protocol. In some embodiments, a memory access protocol may refer to a protocol that may have one or more of the following characteristics: (1) the protocol may transfer data directly, or nearly directly, to and/or from a memory of a receiving apparatus and/or a sending apparatus; (2) the protocol may bypass at least a portion of a network stack for the network path used to transfer the data; (3) the protocol may operate with little or no involvement of one or more central processing units (CPUs) or other processors of a receiving apparatus and/or a sending apparatus; (4) the protocol may transfer data with little or no copying of data, for example, between layers of a network stack or other network software; (5) the protocol may transfer data to and/or from a userspace of an operating system (OS) with little or no involvement of a kernel of the operating system; (6) the protocol may transfer data with the use of few or no context switches, little or no cache space, and/or the like; and/or (7) the protocol may have relatively low overhead, latency, and/or the like. For example, for purposes of illustration, in some embodiments, a memory access protocol in accordance with example embodiments of the disclosure may be implemented with RDMA, but the inventive principles are not limited to use with RDMA or any other memory access protocol.

In some embodiments, the client 102 may function as a server for one or more applications running on the client, one or more other apparatus, and/or the like. For example, in some embodiments, the client 102 may be implemented as a compute server that may run one or more applications that may operate on data that the client 102 may store to, and/or retrieve from, one or more storage resources controlled by the server 104.

In some embodiments, any of the client 102, the server 104, and/or the one or more network targets 106 may be implemented with one or more processors such as complex instruction set computer (CISC) processors such as x86 processors and/or reduced instruction set computer (RISC) processors such as ARM processors, RISC-V processors, and/or the like, microcontrollers, complex programmable logic devices (CPLDs), field programmable gate arrays (FPGAs), application specific integrated circuits (ASICs), and/or the like, any of which may execute instructions stored in any type of memory. In some embodiments, any of the client 102, the server 104, and/or the one or more network targets 106 may be implemented with any processing resources or combination of processing resources that may be arranged, for example, in one or more servers configured, for example, in one or more server chassis, server racks, groups of server racks, datarooms, datacenters, edge data centers, mobile edge datacenters, and/or the like, and/or any combination thereof. In some embodiments, any of the client 102, the server 104, and/or the one or more network targets 106 may be implemented with one or more compute server clusters. In some embodiments, any of the client 102, the server 104, and/or the one or more network targets 106 may be deployed as a software implementation. Although the client 102, the server 104, and the one or more network targets 106 may be illustrated as individual components, in some embodiments, the functions of any one of these components may be distributed between multiple components and/or the functions of one or more of the components may be combined into a common component. Moreover, some embodiments may include multiple clients 102 and/or servers 104.

In some embodiments, any of the first network path 108, one or more second network paths 110, and/or one or more third network paths 112 may be implemented with any networking media, interfaces, protocols, and/or the like, including, for example, Ethernet, FibreChannel, InfiniBand, iWARP, Transmission Control Protocol/Internet Protocol (TCP/IP), User Datagram Protocol/IP (UDP/IP), Hypertext Transfer Protocol (HTTP), Hypertext Transfer Protocol Secure (HTTPS), RDMA, RDMA over Converged Ethernet (RoCE), any generation of wireless network including 2G, 3G, 4G, 5G, and/or the like, any generation of Bluetooth, near-field communication (NFC), and/or the like, or any combination thereof. In some embodiments, any of the first network path 108, one or more second network paths 110, and/or one or more third network paths 112 may be implemented with any interconnect media, interfaces, protocols, and/or the like, including, for example, Peripheral Component Interconnect Express (PCIe), Nonvolatile Memory Express (NVMe), NVMe-over-fabric (NVMe-oF), Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), Advanced eXtensible Interface (AXI) and/or the like, or any combination thereof. In some embodiments, any of the first network path 108, one or more second network paths 110, and/or one or more third network paths 112 may include one or more switches, hubs, routers, gateways networks, networks of networks (e.g., internets) and/or the like. In some embodiments, any of the first network path 108, one or more second network paths 110, and/or one or more third network paths 112 may be implemented with one or more security features such as encryption. For example, in some embodiments, a network protocol, stack, and/or the like may implement a link layer that may support encryption of one or more data transfers using a memory access protocol.

In some embodiments, a memory access protocol may be implemented with hardware, software, or a combination thereof. For example, in embodiments that implement RDMA (e.g., using RoCE), some (e.g., most) of the RDMA functionality may be implemented with an RDMA enabled channel adapter card or network interface card (NIC). In such an embodiment, the hardware RDMA functionality may operate in conjunction with a relatively small kernel module and/or userspace API. As another example, in some embodiments, may implement RDMA, at least in part, using Soft-RoCE, which, although implemented in software, may have significantly less overhead, latency, and/or the like than a network stack having, for example, individual layers for sockets, TCP and/or UDP, IP, Ethernet drivers, and/or the like.

Although the embodiment illustrated in FIG. 1 is not limited to any specific implementation details, for purposes of illustration, in some embodiments, the first network path 108 may be implemented with one or more relatively high overhead and/or latency protocols using a network stack such as HTTP, TCP, and/or the like, any type of object storage protocol, object storage service, remote procedure call for object storage, API service for objects, and/or the like (e.g., over HTTP, TCP, and/or the like), while the one or more second network paths 110 and/or the one or more third network paths 112 may be implemented with one or more protocols have relatively low overhead, latency, and/or the like, for example, a memory access protocol such as RDMA. In some embodiments, the first network path 108 may be, or may be part of, a frontend network, and the one or more second network paths 110 may be, or may be part of, a backend network. Depending on the implementation details, the scheme illustrated in FIG. 1 may reduce the overhead, latency, and/or the like associated with transferring data between the client 102 and one or more network targets 106.

In some embodiments, one or more of the network targets 106 may be configured to send one or more completions to the server 104 through one or more network paths 110 based, for example, on one or more successful transfers of one or more corresponding data payloads 118. In some embodiments, in response to receiving any number of completions from the one or more network targets 106, the server 104 may be configured to send an indication of success, degraded data transfer (e.g., partial success), failure, and/or the like, to the client 102 using the first network path 108. An indication of degraded data transfer may be sent, for example, if less than all of the data payloads 118 associated with a request 114 were successfully transferred, but enough of the data payloads 118 were successfully transferred to enable the client to reconstruct one or more missing data payloads, for example, using an error correction technique such as erasure coding. In some embodiments, in the event of a degraded data transfer, one or more parity data payloads may be transferred from one or more of the network targets 106 to the client 102 through the one or more third networks paths 112 and/or using a memory access protocol. In some embodiments, error correction may be performed at the client 102 rather than the server 104, for example, because the server 104 may not receive the one or more normal and/or parity data payloads 118 to perform an error correction operation.

Figure 2:
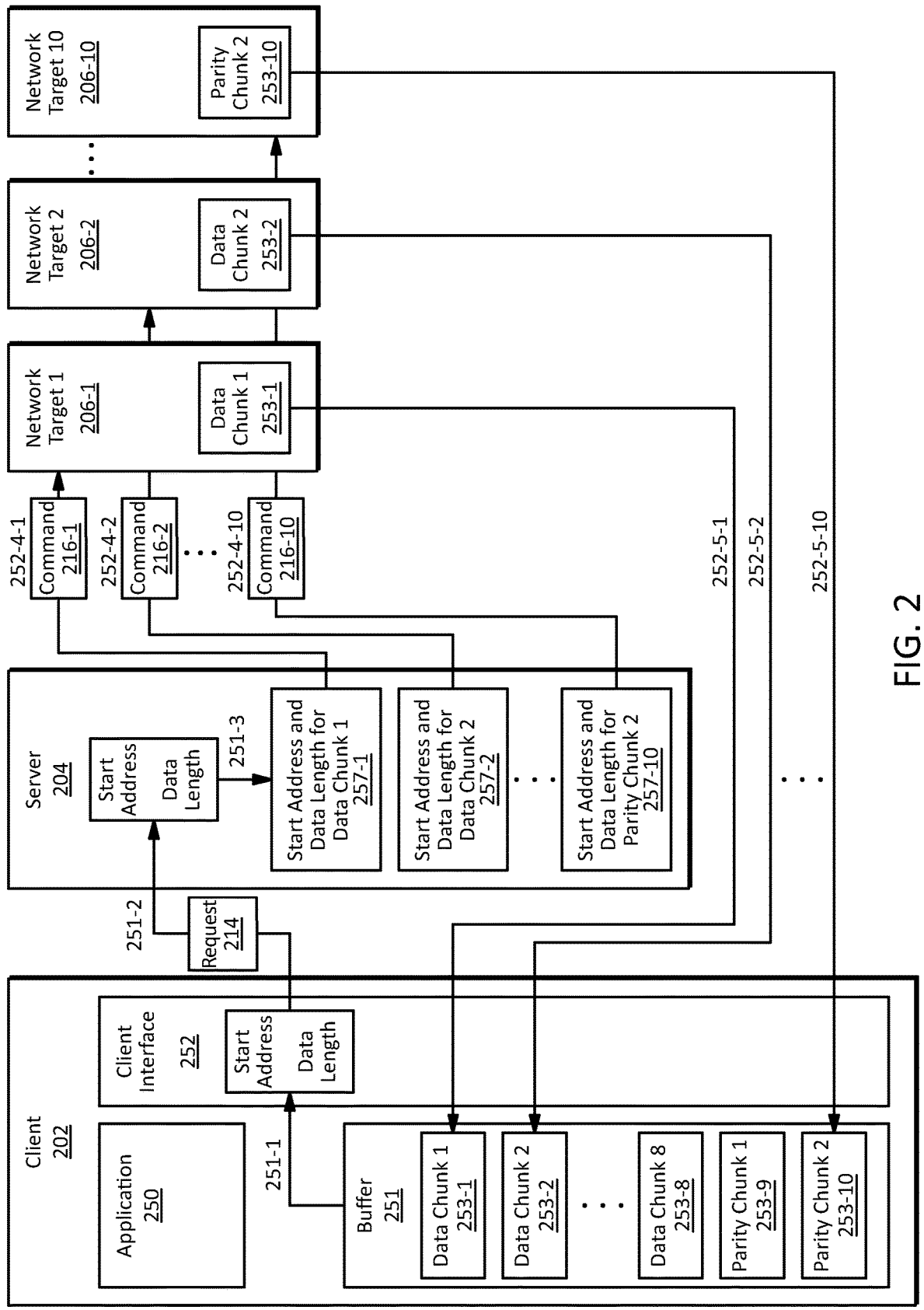
FIG. 2 illustrates an example embodiment of a data transfer scheme with remote data transfer to memory using a memory access protocol in accordance with example embodiments of the disclosure.

FIG. 2 illustrates an example embodiment of a data transfer scheme with remote data transfer to memory using a memory access protocol in accordance with example embodiments of the disclosure. The embodiment illustrated in FIG. 2 may be implemented with, or may be used to implement, the embodiment illustrated in FIG. 1 or any other embodiments described herein. The embodiment illustrated in FIG. 2 may include one or more elements similar to those illustrated in FIG. 1, and elements having reference numerals ending in the same digits may have similar structure and/or functions. For purposes of illustration, the embodiment illustrated in FIG. 2 may be described in the context of some specific implementation details such as network targets implemented as NVMe targets, a memory access protocol implemented with RDMA, data protection implemented with 8:2 erasure coding, and/or the like, but the inventive principles are not limited to these or any other implementation details.

Referring to FIG. 2, the scheme may include a client 202, a server 204, and one or more network targets 206-1, . . . , 206-10, The client 202, server 204, and one or more network targets 206-1, . . . , 206-10 may be connected through one or more first, second, and/or third network paths as illustrated, for example, in FIG. 1.

Referring to FIG. 2, the client 202 may include a client interface 252 that may encapsulate one or more implementation features of the data transfer scheme so as to hide the one or more implementation features from an application 250 running on the client 202. In some embodiments, the application 250 may allocate a client buffer 251 (which may be referred to as an application buffer) for RDMA data transfers from the one or more network targets 206-1, . . . , 206-10. In this example embodiment, the network targets 206-1, . . . , 206-10 may be implemented with an NVMe-oF protocol, and therefore, may be referred to as NVMe targets or NVMe-oF targets. In some embodiments, the client interface 252 may be implemented, for example, with hardware software or a combination therefore including combinational logic, sequential logic, one or more timers, counters, registers, and/or state machines, one or more complex programmable logic devices (CPLDs), field programmable gate arrays (FPGAs), application specific integrated circuits (ASICs), embedded processors, central processing units (CPUs) such as complex instruction set computer (CISC) processors such as x86 processors and/or reduced instruction set computer (RISC) processors such as ARM processors, graphics processing units (GPUs), neural processing units (NPUs), tensor processing units (TPUs), and/or the like, executing instructions stored in any type of memory, or any combination thereof. In an embodiment implemented at least partially with software, the client interface 252 may be implemented, at least partially, with one or more wrappers, libraries (e.g., helper libraries), application programming interfaces (APIs), device drivers, function calls, system calls, and/or the like, or a combination thereof.

For purposes of illustration, in the example embodiment illustrated in FIG. 2, the application 250 may allocate the application buffer 251 with a maximum size that may accommodate 8:2 erasure coding of an object, e.g., a total data payload size of the object that may be divided into eight data chunks 253-1, . . . , 253-8, to which two parity chunks 253-9 and 253-10 may be added. However, any other allocation of data chunks and/or parity chunks may be used.

In the example embodiment illustrated in FIG. 2, the server 204 may be implemented as an object storage server with storage disaggregation that may distribute data chunks of an object, and/or parity chunks, over one or more of the network targets 206-1, . . . , 206-10.

The example embodiment illustrated in FIG. 2 illustrates an object get operation in which the application 250 may request an object from the server 204. The get operation may begin at operation 251-1 wherein the application 250 may provide, to the client interface 252, a start address and data length for the application buffer 251 into which the data chunks 253-1, . . . , 253-8 of the requested object may be transferred. At operation 251-2, The client interface 252 may send a request 214 forwarding the start address and data length for the application buffer 251 to the server 204. The request 214 may be sent using any technique, for example, any type of protocol such as HTTP, TCP, and/or the like, any type of object storage protocol, object storage service, remote procedure call for object storage, API service for objects, and/or the like (e.g., over HTTP, TCP, and/or the like).

At operation 251-3, the server 204 may translate the start address and data length for the application buffer 251 to ten different start addresses and data lengths 257-1, . . . , 257-10 for the ten chunks (e.g., eight data chunks and two parity chunks) within the application buffer 251. At operations 252-4-1, . . . , 252-4-8, the server 204 may send commands 216-1, . . . , 216-8 to the network targets 206-1, . . . , 206-8, respectively. In some embodiments, the commands 216-1, . . . , 216-8 may include the corresponding start addresses and data lengths 257-1, . . . , 257-8 within the application buffer 251 to which the corresponding data chunks 253-1, . . . , 253-8 may be transferred. In some embodiments, server 204 may send the one or more commands 216-1, . . . , 216-8, for example, using NVMe, NVMe-oF, or any other protocol.

In response to the commands 216-1, . . . , 216-8, the network targets 206-1, . . . , 206-8 may retrieve the corresponding data chunks 253-1, . . . , 253-8 from corresponding storage resources (for example, an object (e.g., a key-value (KV) pair) store distributed over the storage resources and managed by the server 204). At operations 253-5-1, . . . , 253-5-8, the network targets 206-1, . . . , 206-8 may transfer the corresponding data chunks 253-1, . . . , 253-8 to the corresponding portions of the application buffer 251 indicated by the start addresses and data lengths 257-1, . . . , 257-8, for example, using MDMA or any other memory access protocol.

In some embodiments, one or more of the network targets 206-1, . . . , 206-8 may send one or more completions to the server 204 based on a successful completion of one or more data transfers at operations 253-5-1, . . . , 253-5-8.

In some embodiments, depending on the success or failure of one or more of the data transfers at operations 253-5-1, . . . , 253-5-8, the server 204 may send one or more of the commands 216-9 and 216-10 to the corresponding network targets 206-9 and 206-10, respectively, to instruct the targets 206-9 and 206-10 to retrieve one or more of the parity chunks 253-9 and 253-10, respectively. For example, if one or two of the data transfers at operations 253-5-1, . . . , 253-5-8 failed, the server 204 may send one or more of the commands 216-9 and 216-10 to retrieve and transfer one or more parity chunks to the application buffer 251 so the client interface 252 may reconstruct the one or two missing data chunks. In some embodiments, server 204 may send one or more of commands 216-9 and 216-10, for example, using NVMe, NVMe-oF, or any other protocol.

In some embodiments, the commands 216-9 and 216-10 may include the corresponding start addresses and data lengths 257-9 and 257-10 within the application buffer 251 to which the corresponding parity chunks 253-9 and 253-10 may be transferred. One or more of the targets 206-9 and 206-10 may then retrieve one or more of the corresponding parity chunks 253-9 and 253-10 from corresponding storage resources and transfer the one or more parity chunks 253-9 and 253-10 to the corresponding portions of the application buffer 251, for example, using RDMA or any other memory access protocol.

In some embodiments, one or more data transfers may potentially be implemented, partially or entirely, with a zero-copy transfer. In some embodiments, performing a zero copy transfer may involve, for example, transferring data between a target and a memory of a client using a memory access protocol (e.g., RDMA), For example, in some embodiments, one or more data transfers may be implemented with a zero-copy transfer by transferring data directly to a memory of a receiving device (e.g., memory 120 illustrated in FIG. 1 and/or buffer 251 illustrated in FIG. 2). As another example, in some embodiments, one or more data transfers may be implemented, at least partially, with a zero-copy transfer to a first memory and then transferred to a second memory. For example, the embodiment illustrated in FIG. 2 may be modified to include a transfer buffer (e.g., an RDMA buffer) associated with the client interface 252, One or more of the data chunks 253 may be transferred to such a transfer buffer with a zero-copy transfer, then transferred to the buffer 251.

Figure 3A:
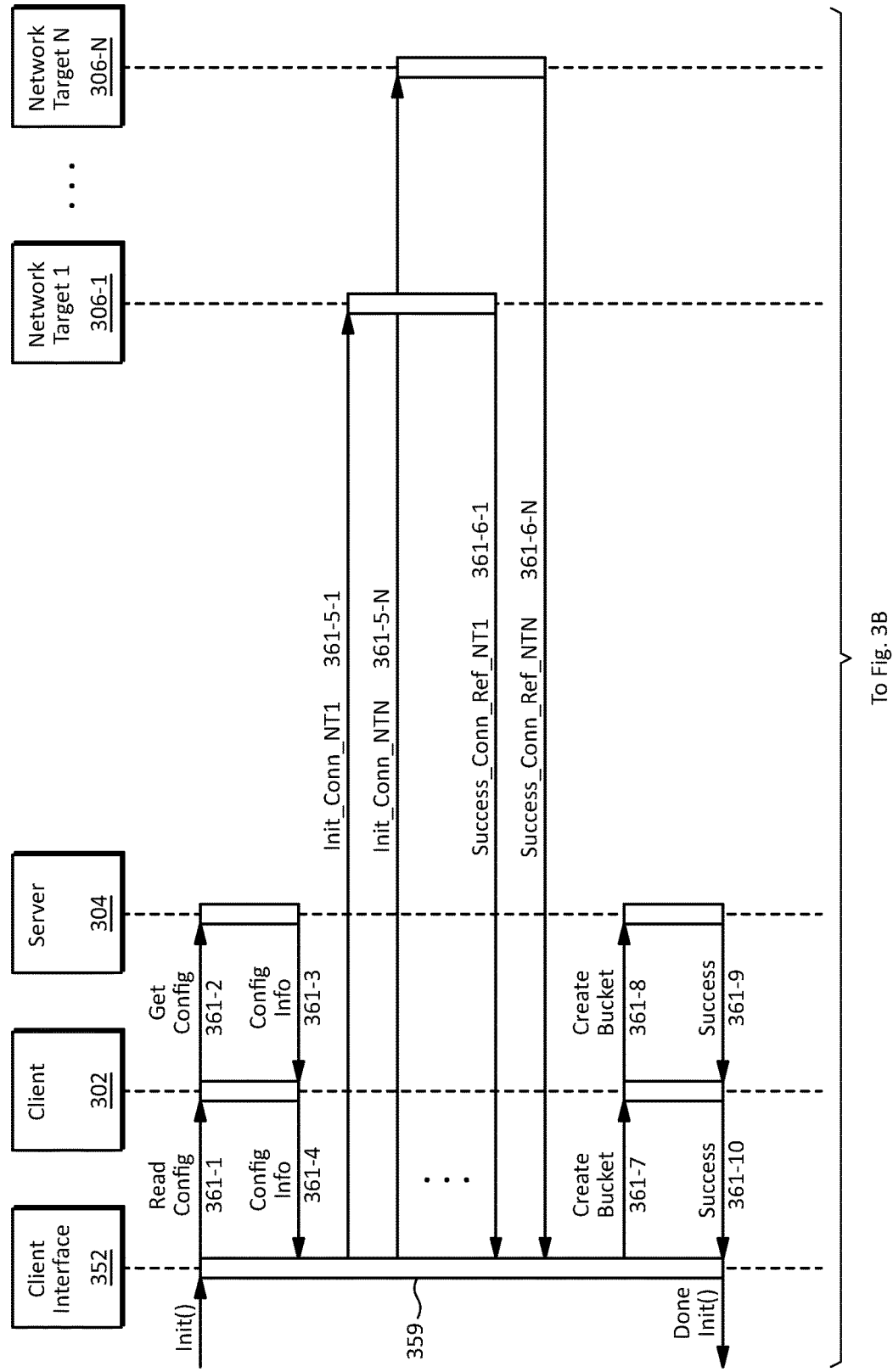
FIG. 3A illustrates a first portion of a sequence diagram for an embodiment of a data transfer scheme with remote data transfer to memory using a memory access protocol in accordance with example embodiments of the disclosure.
Figure 3B:
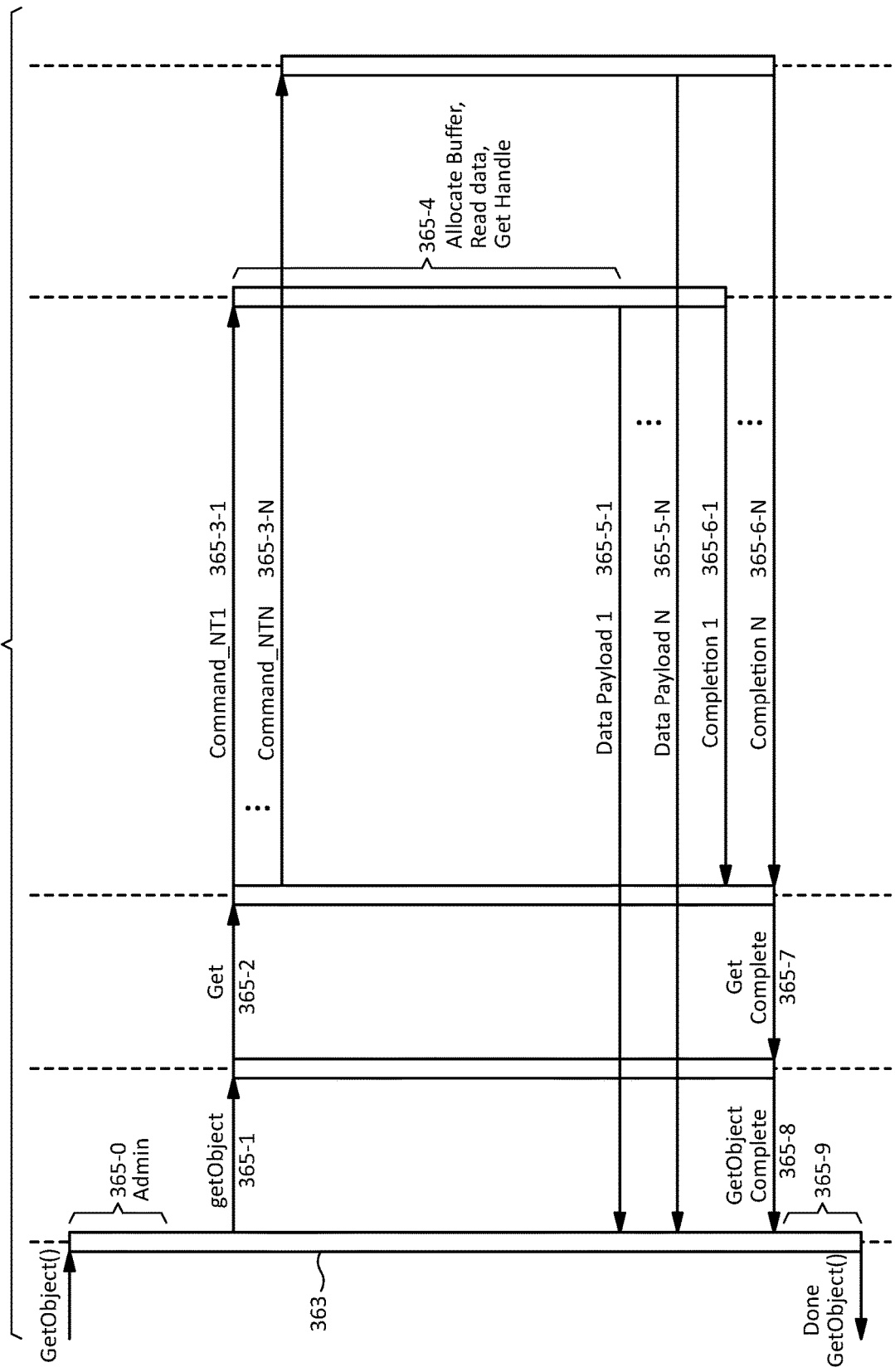
FIG. 3b illustrates a second portion of a sequence diagram for an embodiment of a data transfer scheme with remote data transfer to memory using a memory access protocol in accordance with example embodiments of the disclosure.

FIG. 3A illustrates a first portion of a sequence diagram for an embodiment of a data transfer scheme with remote data transfer to memory using a memory access protocol in accordance with example embodiments of the disclosure. FIG. 3b illustrates a second portion of a sequence diagram for an embodiment of a data transfer scheme with remote data transfer to memory using a memory access protocol in accordance with example embodiments of the disclosure.

FIG. 3A and FIG. 3B collectively form a single drawing which may be referred to as FIG. 3.

The embodiment illustrated in FIG. 3 may be implemented with, or may be used to implement, the embodiments illustrated in FIG. 1, FIG. 2, or any other embodiments described herein. The embodiment illustrated in FIG. 3 may include one or more elements similar to those illustrated in FIG. 1, FIG. 2, or any other embodiments described herein, and elements having reference numerals ending in the same digits may have similar structure and/or functions. For purposes of illustration, the embodiment illustrated in FIG. 3 may be described in the context of some specific implementation details such as a server implemented as an object (e.g., KV) storage server, but the inventive principles are not limited to these or any other implementation details. In FIG. 3, information, signals, messages, software calls and/or returns, and/or the like, may generally flow horizontally as shown by arrows, and time may generally progress downward, with periods of operations by the components shown as solid bars over their respective vertical time lines.

Referring to FIG. 3, a data transfer system may include a client 302, a server 304, and one or more network targets 306-1, . . . , 306-N (which may be referred to collectively as 306) that may provide access to one or more resources controlled by the server 304. A client interface 352 may run on the client 302. In some embodiments, the client 302 (including the client interface 352) may communicate with the server 304, for example, through one or more first network paths and/or a network stack that may implement one or more protocols such as HTTP, TCP, and/or the like, any type of object storage protocol, object storage service, remote procedure call for object storage, API service for objects, and/or the like (e.g., over HTTP, TCP, and/or the like). In some embodiments, the server 304 may communicate with the one or more network targets 306-1, . . . , 306 N through one or more second network paths that may implement a memory access protocol such as RDMA. In some embodiments, the client 302 (including the client interface 352) may communicate with the one or more network targets 306-1, . . . , 306-N through one or more third network paths that may implement a memory access protocol such as RDMA.

For purposes of illustration, some embodiments described herein may use example names for function calls (e.g., init( ), GetObject( ), and/or the like), but these names are examples only, and any names may be used. An initiation procedure 359 for a memory access protocol (e.g., RDMA) may begin when an application calls an initiation function Init( ) of the client interface 352. The client interface 352 may invoke a read configuration call at operation 361-1 which may cause the client 302 to send a get configuration request to the server 304 at operation 361-2. The server 304 may respond with a message to the client 302 at operation 361-3 sending the requested network configuration information for the one or more network targets 306-1, . . . , 306-N, erasure coding information, and/or the like, which may be forwarded to the client interface 352 at operation 361-4. In some embodiments, network configuration information may include information such as the type, number, location, capabilities, and/or the like, of apparatus connected to the network, the locations of one or more hubs, switches, routers, gateways, and/or the like, connected to the network, one or more identifiers (e.g., network identifiers), network addresses (e.g., internet protocol (IP) addresses), handles, authentication information, port information, connection identifiers (IDs), encryption keys, security keys, digital certificates, and/or any other information that may help a client, server, network target, and/or the like, determine how to transmit data through the network.

Using the network configuration information, the client interface 352 may initiate memory access protocol (e.g., RDMA) connections with one or more of the network targets 306-1, . . . , 306-N by sending initiation messages at operations 361-5-1, . . . , 361-5-N. One or more of the network targets 306-1, . . . , 306-N may respond with one or more success messages including one or more connection reference numbers, handles, and/or the like at operations 361-6-1, . . . , 361-6-N.

In some embodiments, the initiation procedure 359 may continue when the client interface 352 may invoke a create bucket call at operation 361-7 which may cause the client 302 to send a create bucket request to the server 304 at operation 361-8. The server 304 may respond with a message to the client 302 at operation 361-9 indicating successful creation of the bucket, which may be forwarded to the client interface 352 at operation 361-10. The initiation procedure 359 may conclude with the client interface 352 returning a done status of the initiation function Init( ) to the application. In some embodiments, creating a bucket may involve a client determining a bucket name, region, storage management options, ownership rights, access permissions, and/or the like, for a bucket. In some embodiments, creating a bucket may involve a server implementing a bucket name, region, storage management options, ownership rights, access permissions, and/or the like, for a bucket, for example, as determined by a client.

A data transfer procedure 363 (in this example, an object get procedure) may begin when the application invokes a GetObject( ) call of the client interface 352. The client interface 352 may begin the GetObject( ) call by performing one or more administrative functions at operation 365-0. For example, the client interface 352 may reuse an application buffer, collect one or more start addresses and/or data lengths for the application buffer, allocate one or more buffers for parity data, collect one or more start addresses and/or data lengths for the parity buffers, and/or the like. In this example embodiment, a key for a KV pair may be used to store address and/or data length information, protocol connection information, and/or the like. Thus, at operation 365-0, the client interface 352 may prepend a key with address, data length, protocol connection information, and/or the like.

The actual data transfer procedure may begin when the client interface 352 invokes a getObject call at operation 365-1 which may cause the client 302 to send a Get request to the server 304 at operation 365-2. The server 304 may respond to the Get request by sending one or more commands (e.g., Command_NT1, . . . , Command NTN) to one or more of the network targets 306-1, . . . , 306-N at operations 365-3-1, . . . , 365-3-N. In some embodiments, one or more of the commands may include information (e.g., RDMA information such as a data length, start address, client identifier, and/or the like) to enable the one or more network targets 306-1, . . . , 306-N to perform a data transfer operation using a memory access protocol (e.g., RDMA), The one or more network targets 306-1, . . . , 306-N may begin responding to the commands by performing one or more internal tasks such as allocating a local buffer, reading one or more chunks of the requested data from one or more local storage devices, obtaining a connection handle (e.g., a connection reference number) from the command, and/or the like at operation 365-4 (as shown for network target 306-1).

The one or more network targets 306-1, . . . , 306-N may perform one or more transmissions of the requested data to the client 302 as data payloads using the memory access protocol (e.g., RDMA) at operations 365-5-1, . . . , 365-5-N, using, for example, information such as data length, start address, and/or the like. The one or more network targets 306-1, . . . , 306-N may send one or more completions corresponding to the one or more data payload transmissions to the server 304 at operations 365-6-1, . . . , 365-6-N.

At operation 365-7, the server 304 may send a Get complete message to the client 302 which may send a return to the client interface 352 at operation 365-8. In some embodiments, at operation 365-9, the client interface 352 may return the getObject to the application with data or a pointer to the data transferred from the one or more network targets 306-1, . . . , 306-N. However, in some embodiments, the getObject return may be ignored, for example, because the one or more network targets 306-1, . . . , 306-N may have transferred the requested data directly to the application buffer using the memory access protocol (e.g., RDMA). The data transfer procedure 363 may conclude with the client interface 352 returning a done status of the GetObject( ) function to the application.

Figure 4:
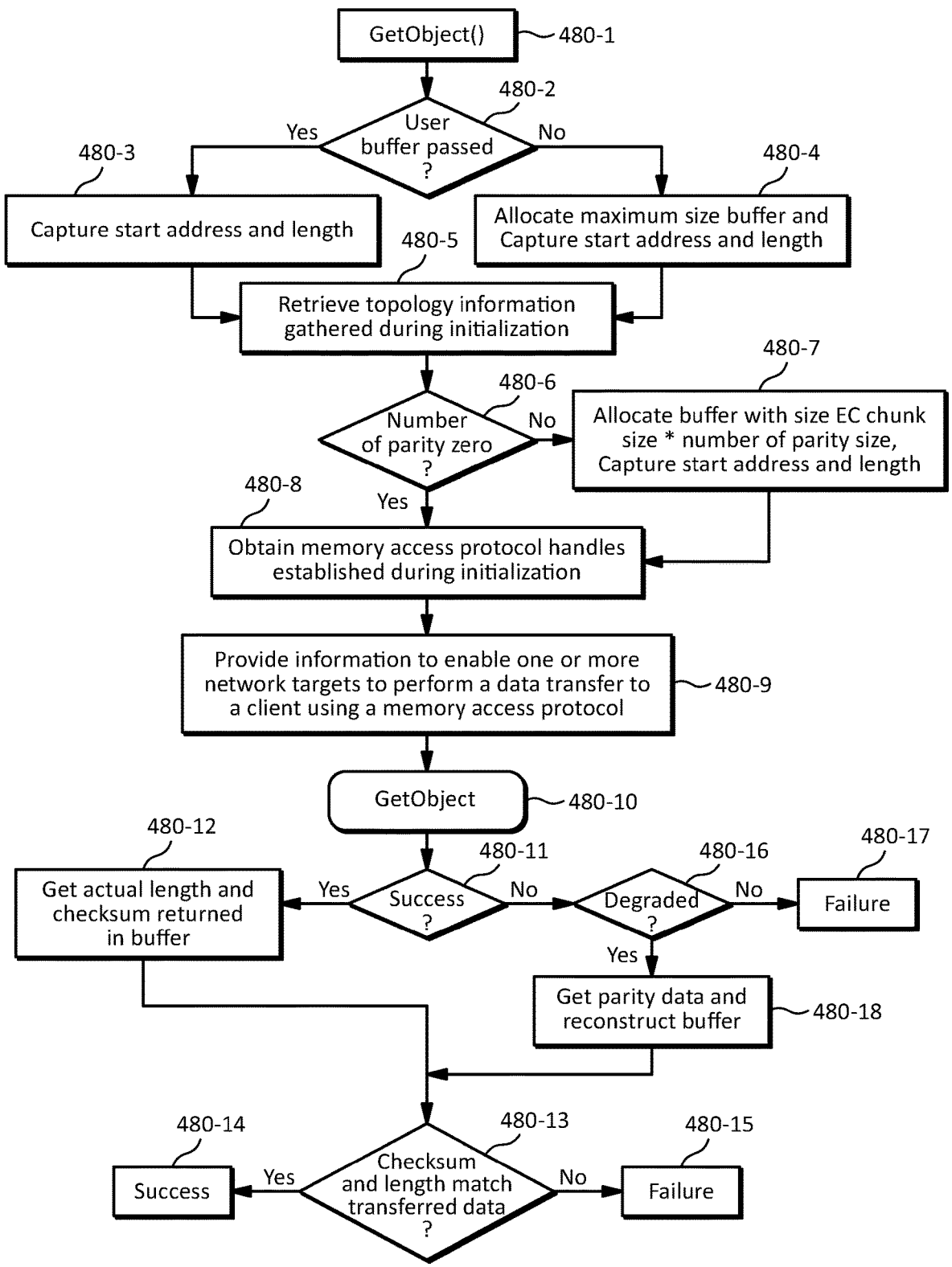
FIG. 4 illustrates an example embodiment of a method for a client side flow for an embodiment of a data transfer scheme with remote data transfer to memory using a memory access protocol in accordance with example embodiments of the disclosure.

FIG. 4 illustrates an example embodiment of a method for a client side flow for an embodiment of a data transfer scheme with remote data transfer to memory using a memory access protocol in accordance with example embodiments of the disclosure. The embodiment illustrated in FIG. 4 may be implemented with, or may be used to implement, any of the clients disclosed herein such as the clients 102, 202, and/or 302 illustrated in FIG. 1, FIG. 2, and/or FIG. 3. For purposes of illustration, the embodiment illustrated in FIG. 4 may be described in the context of some specific implementation details such as a server implemented as an object (e.g., KV) storage server, a memory access protocol implemented with RDMA, and/or the like, but the inventive principles are not limited to these or any other implementation details.

Referring to FIG. 4, the method may begin when an application calls a GetObject( ) function at operation 480-1. At operation 480-2, the method may determine if a user buffer has been passed to the function. If a user buffer has been passed, the method may capture a start address and/or data length for the user buffer at operation 480-3. Otherwise, the method may allocate a buffer (e.g., having a maximum buffer size for any data and/or parity chunks) and capture a start address and/or data length for the newly allocated buffer at operation 480-4. The method may proceed from operation 480-3 or 480-4 to operation 480-5 where the client may retrieve network topology (e.g., network configuration) information obtained using an init( ) function (e.g., as illustrated in FIG. 3). In some embodiments, network topology and/or configuration information may include information such as the type, number, location, capabilities, and/or the like, of apparatus connected to the network, the locations of one or more hubs, switches, routers, gateways, and/or the like, connected to the network, one or more identifiers (e.g., network identifiers), network addresses (e.g., IP addresses), handles, authentication information, port information, connection IDs, encryption keys, security keys, digital certificates, and/or any other information that may help a client, server, network target, and/or the like, determine how to transmit data through the network. The method may also determine the number of parity chunks and/or bits to be used.

At operation 480-6, the method may check the number of parity chunks and/or bits. If the number is zero, the method may proceed to operation 480-8. However, if at operation 480-6 the number of parity chunks and/or bits is determined to be non-zero, it may indicate that an error correction (e.g., erasure coding) technique has not been selected. Thus, the method may proceed to operation 480-7 where the client may allocate a buffer with a size based, for example, on an erasure coding (EC) chunk size and/or the number of parity chunks. The method may also capture a start address and/or data length for the parity buffer and proceed to operation 480-8.

At operation 480-8, the method may collect the memory access protocol (e.g., RDMA) handles established during an initialization phase (e.g., using the init( ) function as illustrated in FIG. 3). At operation 480-9, the method may provide information to enable one or more network targets to perform a data transfer to a client using a memory access protocol. This information may include, for example, information to identify the data to be transferred. This information may include, for example, access information to determine how to perform a memory access protocol operation. For example, in some embodiments, the information to enable one or more network targets to perform a data transfer to a client using a memory access protocol may be provided by including one or more of a data length, data start address, parity length, parity start address, handles for one or more network targets, and/or the like, in one or more fields (e.g., unused fields) in a request message for an object storage protocol (e.g., in one or more comma and/or colon separated fields). As another example, in some embodiments, the information to enable one or more network targets to perform a data transfer to a client using a memory access protocol may be provided by generating an encoded object key, for example, by encoding one or more of the following information in an object key: data length, data start address, parity length, parity start address, one or more handles for one or more network targets (e.g., network targets 306-1, . . . , 306-N illustrated in FIG. 3), and/or the actual (e.g., original) contents of the object key. In some embodiments, providing information in a field of a message and/or encoding the information in an encoded key may involve the use of a one or more tags, delimiters, and/or the like, that may not be used as a key (e.g., one or more special characters). These examples are provided for purposes of illustration, and any other techniques may be used to provide information to enable one or more network targets to perform a data transfer to a client using a memory access protocol.

At operation 480-10, the method may initiate the transfer of data between one or more network targets and the client using a memory access protocol, for example, by invoking a get object call (e.g., the GetObject( ) call 363 illustrated in FIG. 3). In some embodiments, the data that is transferred between one or more network targets and the client using a memory access protocol may include the actual (e.g., original) object key, whereas one or more of the data length, data start address, parity length, parity start address, handles for one or more network targets, and/or the like, encoded in the encoded object key may be used by a client (e.g., client 102, 202, and/or 302 illustrated in FIG. 1, FIG. 2, and/or FIG. 3), a server (e.g., server 104, 204, and/or 304 illustrated in FIG. 1, FIG. 2, and/or FIG. 3), and/or one or more network targets (e.g., target(s) 106, 206, and/or 306-1, . . . , 306-N illustrated in FIG. 1, FIG. 2, and/or FIG. 3) to implement the transfer of data from one or more network targets to the client using a memory access protocol. In some embodiments, the get object call and/or return may be sent over a network such as one or more first network paths and/or a network stack that may implement one or more protocols such as HTTP, TCP, and/or the like, any type of object storage protocol, object storage service, remote procedure call for object storage, API service for objects, and/or the like (e.g., over HTTP, TCP, and/or the like).

At operation 480-11, the method may determine if the get object call at operation 480-10 was successful. The get object call may be considered successful, for example, if all of the data transfers at operations 365-5-1, . . . , 365-5-N in FIG. 3 completed successfully, that is, if all of the data chunks where successfully transferred directly to the client buffer. If the get object call was successful, the method may proceed to operation 480-12 where the method may obtain the actual length and a checksum (e.g., an md5sum) which may have been returned in a buffer (e.g., a dummy buffer). At operation 480-13, the method may determine if the actual length and checksum match those transferred via the get object call at operation 480-10. If the actual length and checksum match, the method may conclude at operation 480-14 with a status of success, otherwise, the method may conclude at operation 480-15 with a status of failure.

If, however, at operation 480-11, the method determines that the get object call at operation 480-10 was not successful (e.g., less than all of the data chunks for the requested object were successfully transferred), the method may proceed to operation 480-16 where the method may determine if the get object call at operation 480-10 has transferred degraded data. In some embodiments, the transferred data may be considered degraded if enough data chunks were transferred to enable the missing chunks to be reconstructed from parity chunks (e.g., if the number of missing chunks is less than or equal to the number of parity chunks). If the transferred data may not be considered degraded (e.g., the object call at operation 480-10 did not transfer enough data chunks), the method may conclude at operation 480-17 with a status of failure.

If, however, at operation 480-16, the method determines that the get object call at operation 480-10 transferred degraded data, the method may proceed to operation 480-18 where it may obtain the one or more parity chunks which it may use to reconstruct the missing one or more data chunks. The method may then proceed to operation 480-13 as described above.

Figure 5A:
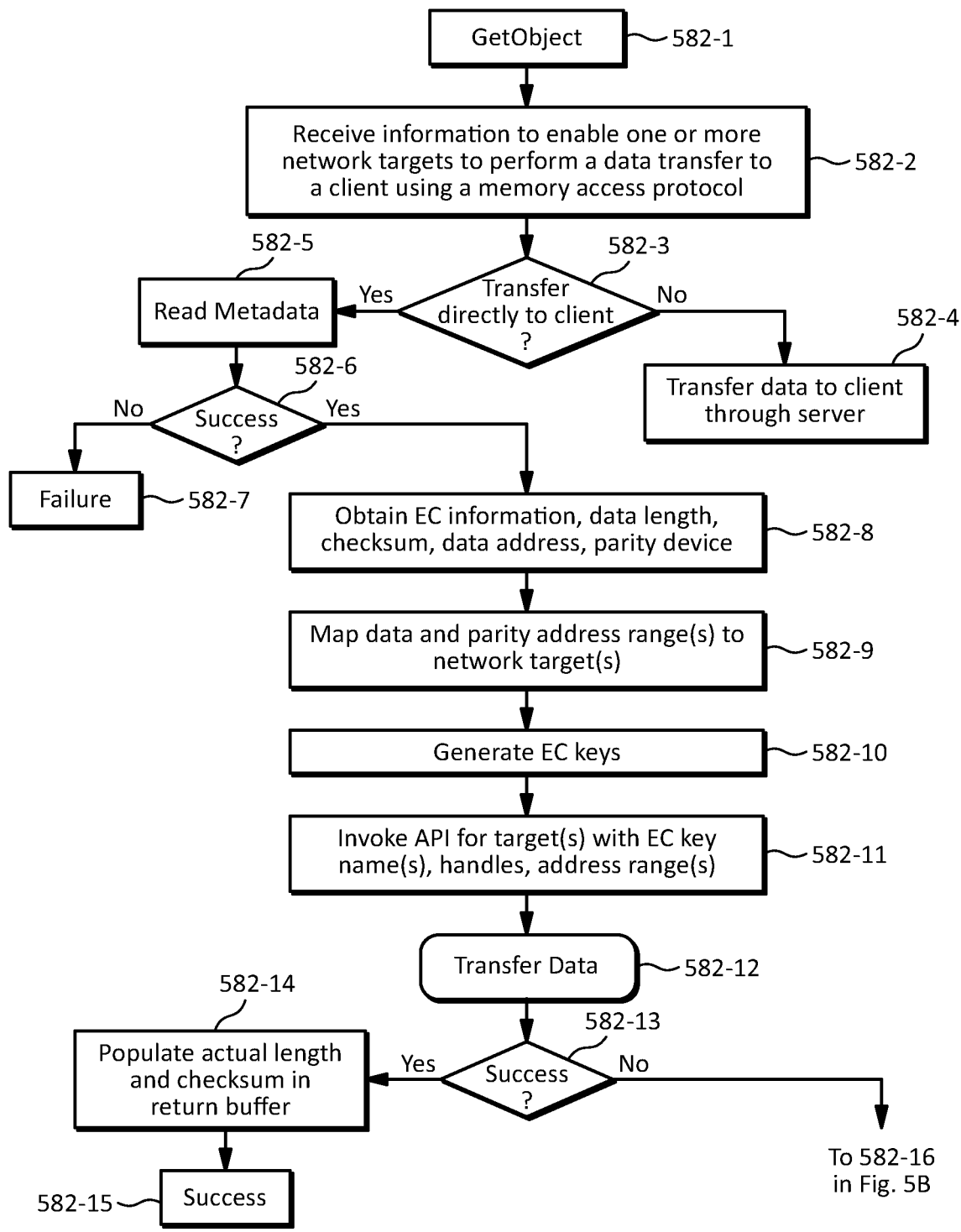
FIG. 5A illustrates a first portion of an example embodiment of a method for a server side flow for an embodiment of a data transfer scheme with remote data transfer to memory using a memory access protocol in accordance with example embodiments of the disclosure.
Figure 5B:
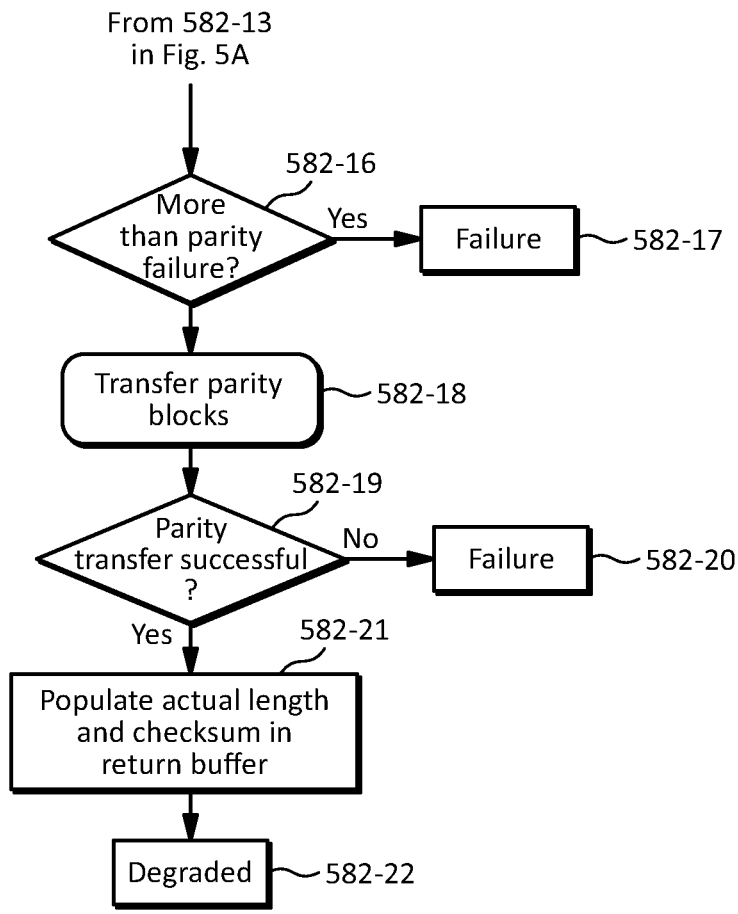
FIG. 5B illustrates a second portion of an example embodiment of a method for a server side flow for an embodiment of a data transfer scheme with remote data transfer to memory using a memory access protocol in accordance with example embodiments of the disclosure.

FIG. 5A illustrates a first portion of an example embodiment of a method for a server side flow for an embodiment of a data transfer scheme with remote data transfer to memory using a memory access protocol in accordance with example embodiments of the disclosure. FIG. 5B illustrates a second portion of an example embodiment of a method for a server side flow for an embodiment of a data transfer scheme with remote data transfer to memory using a memory access protocol in accordance with example embodiments of the disclosure. FIG. 5A and FIG. 5B may be referred to collectively as FIG. 5. The embodiment illustrated in FIG. 5 may be implemented with, or may be used to implement, any of the servers disclosed herein such as the servers 104, 204, and/or 304 illustrated in FIG. 1, FIG. 2, and/or FIG. 3. The embodiment illustrated in FIG. 5 may implement one or more server side operations that interact, for example, with one or more of the client side operations illustrated in FIG. 4. For purposes of illustration, the embodiment illustrated in FIG. 5 may be described in the context of some specific implementation details such as a server implemented as an object (e.g., KV) storage server, a memory access protocol implemented with RDMA, and/or the like, but the inventive principles are not limited to these or any other implementation details.

Referring to FIG. 5, the method may begin at operation 582-1 when the server may receive a get object request (e.g., the request illustrated operation 365-2 in FIG. 3). At operation 582-2, the method may receive information to enable one or more network targets to perform a data transfer to a client using a memory access protocol. For example, this information may be received in one or more fields (e.g., unused fields) in a request message for an object storage protocol (e.g., in one or more comma and/or colon separated fields). As another example, in some embodiments, the information may be received by decoding one or more of the following information from an object key: data length, data start address, parity length, parity start address, one or more handles for one or more network targets (e.g., network targets 306-1, . . . , 306-N illustrated in FIG. 3) which may have been encoded in an encoded object key, for example, as described with reference to operation 480-9 in FIG. 4 and/or the actual (e.g., original) contents of the object key.

At operation 582-3, the method may determine if data is to be transferred directly between one or more targets and the client (e.g., to and/or from a memory at the client using a memory access protocol such as RDMA). In some embodiments, the method may determine that data is to be transferred directly between one or more targets and the client, for example, by determining the status of a flag, by determining that a data length sent with the get object request is greater than zero, and/or the like. If the data is not to be transferred directly between one or more targets and the client (e.g., if a data length sent with the get object request is zero), the method may proceed to operation 582-4 where it may complete the request by transferring the data between one or more targets and the client through a server. For example, the server may send one or more commands to one or more network targets that may return requested data to the server (e.g., using a memory access protocol such as RDMA) which may then send the requested data to the client (e.g., through a network such as one or more first network paths and/or a network stack that may implement one or more protocols such as HTTP, TCP, and/or the like, any type of object storage protocol, object storage service, remote procedure call for object storage, API service for objects, and/or the like (e.g., over HTTP, TCP, and/or the like)).

If, however, at operation 582-3, the method determines that the data is to be transferred directly between one or more targets and the client (e.g., to and/or from a memory at the client using a memory access protocol such as RDMA), the method may proceed to operation 582-5 where it may issue a metadata read. At operation 582-6, the method may determine if the metadata read was successful. If the metadata read was not successful, the method may conclude at operation 582-7 with a status of failure. If, however, the metadata read was successful, the method may proceed to operation 582-8 where the method may obtain information that may be used to retrieve the requested data object from one or more storage resources that may be accessed using one or more network targets. This information may include one or more of the following for one or more network targets: error correction (e.g., erasure coding) information, data length, checksum (e.g., md5 checksum), data address, one or more parity storage devices, and/or the like.

At operation 582-9, the method may use the data obtained at operation 582-8 to map (e.g., deterministically) one or more data address ranges and/or parity address ranges to one or more network targets. At operation 582-10, the method may generate one or more error correction (e.g., erasure coding) key names. At operation 582-11, the method may invoke an API for one or more of the network targets, for example, using erasure coding key names, memory access protocol (e.g., RDMA) handles, address ranges, and/or the like.

At operation 582-12, the method may initiate the transfer of the requested data (e.g., object) from one or more network targets to a memory buffer of a client. This may include, for example, the server sending one or more commands to one or more network targets (e.g., operations 365-3-1, . . . , 365-3-N as illustrated in FIG. 3), the one or more network targets retrieving and/or transferring one or more requested data chunks to the client (e.g., operations 365-5-1, . . . , 365-5-N as illustrated in FIG. 3), and/or the one or more network targets sending one or more completions to the server (e.g., operations 365-6-1, . . . , 365-6-N as illustrated in FIG. 3).

At operation 582-13, the method may determine if the data transfer at operation 582-12 was successful. The data transfer may be considered successful, for example, if all of the data payload transfers at operations 365-5-1, . . . , 365-5-N in FIG. 3 completed successfully, that is, if all of the data chunks where successfully transferred directly to the client buffer. If the data transfer was successful, the method may proceed to operation 582-14 where the server may populate the actual length and a checksum (e.g., an md5sum) in a return buffer for the client to use to verify the checksum of the transferred data. The method may then conclude at operation 582-15 with a status of success.

If, however, at operation 582-13, the server determines that the data transfer at operation 582-12 was not successful (e.g., less than all of the data chunks for the requested object were successfully transferred), the method may proceed to operation 582-16 where it may determine if the data transfer at operation 582-12 transferred enough data chunks to enable the missing chunks to be reconstructed from parity chunks (e.g., if the number of missing chunks is less than or equal to the number of parity chunks). If not enough data chunks were transferred successfully to enable the missing chunks to be reconstructed from parity chunks (e.g., if the number of missing chunks is greater than the number of parity chunks), the method may conclude at operation 582-17 with a status of failure.

If, however, at operation 582-16, the method determines that operation 582-12 transferred enough data chunks to enable the missing chunks to be reconstructed from parity chunks (e.g., if the number of missing data chunks is less than or equal to the number of parity chunks), the transferred data may be considered degraded. Thus, the method may proceed to operation 582-18 where the server may initiate the transfer of one or more parity chunks from one or more network targets to the memory buffer of the client. This may include, for example, the server sending one or more commands to one or more network targets (e.g., similar to operations 365-3-1, . . . , 365-3-N as illustrated in FIG. 3), the one or more network targets retrieving and/or transferring one or more requested parity chunks to the client (e.g., similar to operations 365-5-1, . . . , 365-5-N as illustrated in FIG. 3), and/or the one or more network targets sending one or more completions to the server (e.g., similar to operations 365-6-1, . . . , 365-6-N as illustrated in FIG. 3).

At operation 582-19, the method may determine if the transfer of parity chunks was successful (e.g., if the number of parity chunks transferred is adequate for rebuilding the one or more missing data chunks.). If the parity chunks was not successful, the method may conclude at operation 582-20 with a status of failure. If, however, at operation 582-19, the transfer of parity chunks was successful, the method may proceed to operation 582-21 where the server may populate the actual length and a checksum (e.g., an md5sum) in the return buffer for the client to use to verify the checksum of the transferred data. The method may then conclude at operation 582-22 with a status of degraded.

For purposes of illustration, the embodiments described with respect to FIG. 2, FIG. 3, FIG. 4, and FIG. 5 may illustrate examples of get operations. However, put and/or other operations may be implemented in a similar manner, for example, with a data payload being transferred (e.g., using RDMA) directly from a client memory to one or more target memories at one or more network targets, and/or with the one or more network targets sending one or more completions to a server.

Figure 6:
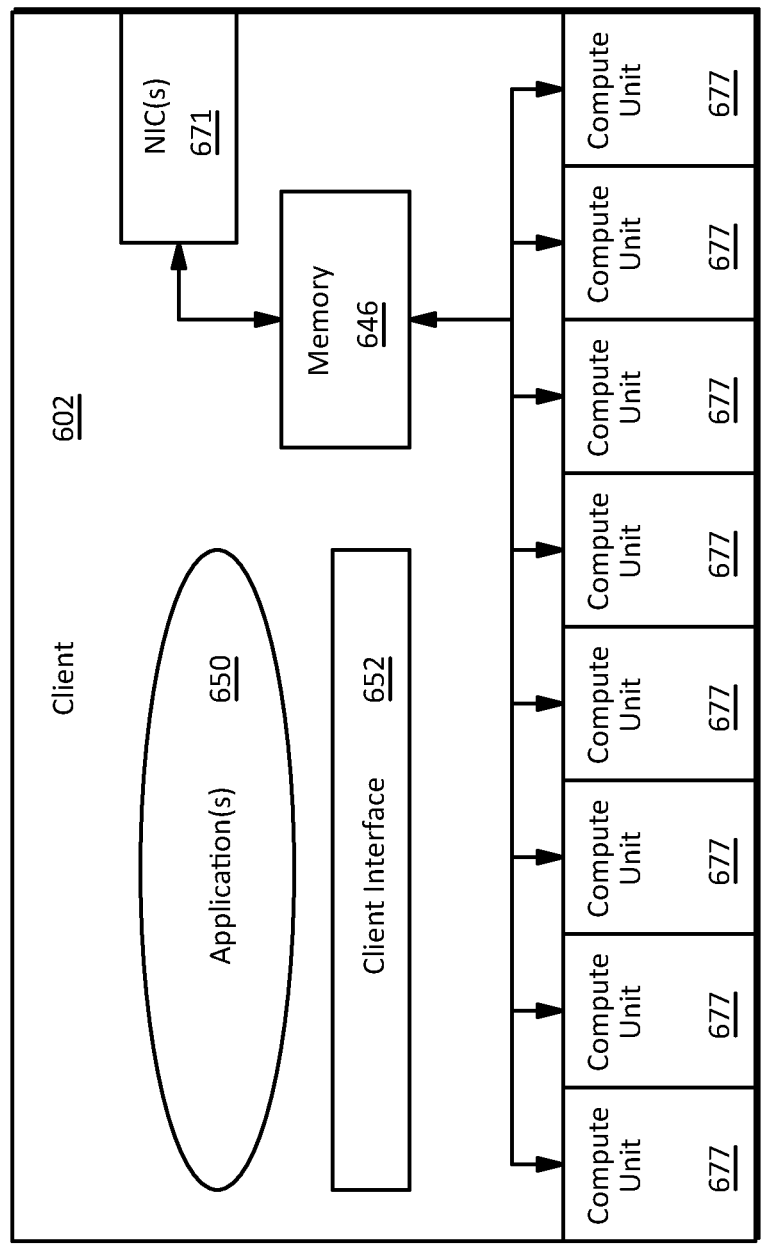
FIG. 6 illustrates an example embodiment of a client in accordance with example embodiments of the disclosure.

FIG. 6 illustrates an example embodiment of a client in accordance with example embodiments of the disclosure. The client 602 illustrated in FIG. 6, may be implemented with, or may be used to implement, any of the clients disclosed herein such as the clients 102, 202, and/or 302 illustrated in FIG. 1, FIG. 2, and/or FIG. 3. For purposes of illustration, the embodiment illustrated in FIG. 6 may be described in the context of some specific implementation details, but the inventive principles are not limited to these or any other implementation details.

Referring to FIG. 6, the client 602 may include a memory 646, a client interface 652, one or more NICs 671, and one or more compute units 677, The memory 646 and/or one or more compute units 677 may be used by one or more applications 650 running on the client 602. Thus, in some embodiments, the client 602 may appear as a compute server to the one or more applications 650. The client interface 652 may be implemented, for example, with one or more wrapper libraries (which may also be referred to as helper libraries) that may hide one or more of the data transfer operations from the one or more applications 650. In some embodiments, the client interface 652 may implement remote data transfer to memory (e.g., memory 646) using a memory access protocol (e.g., RDMA).

Figure 7:
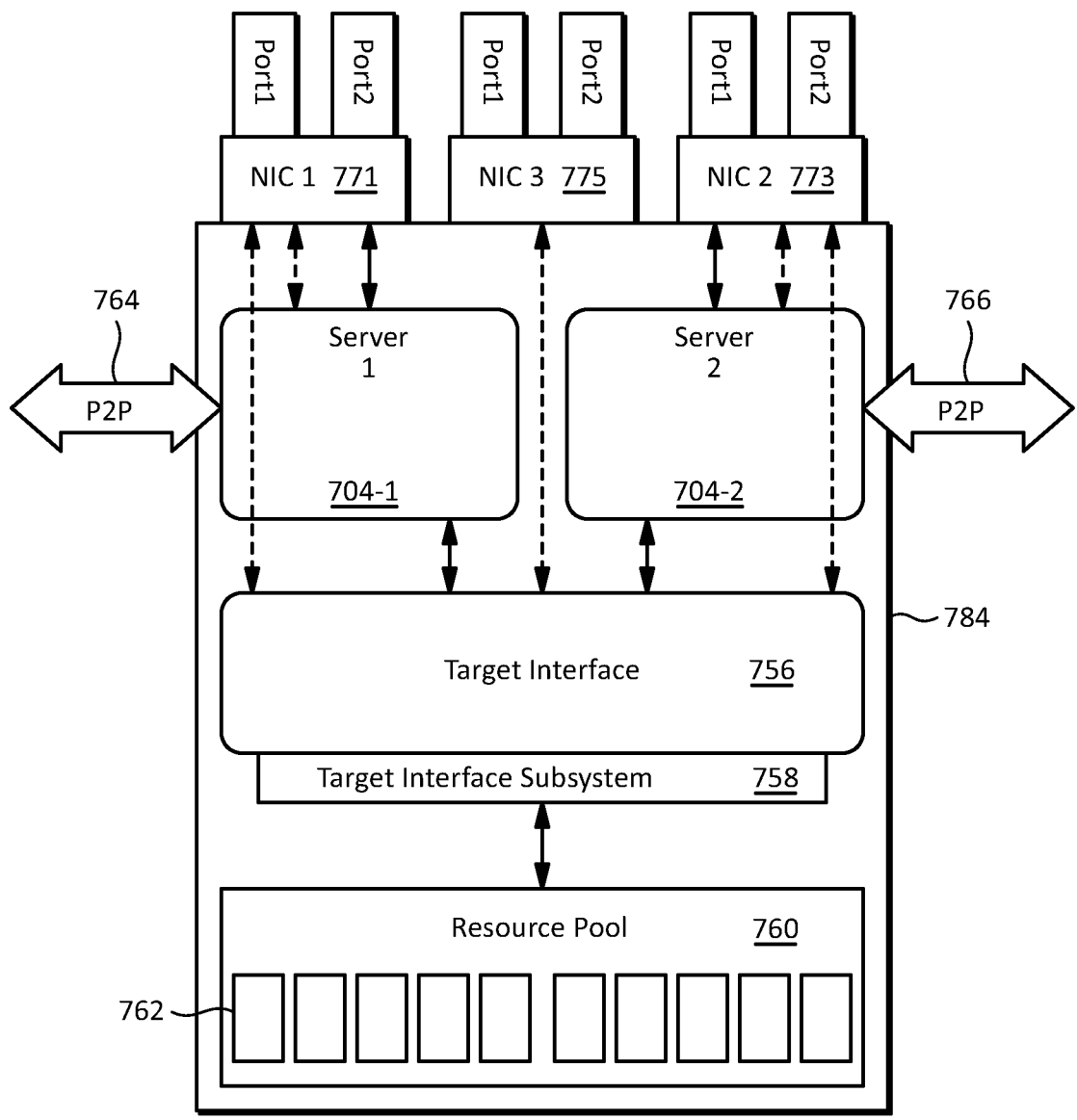
FIG. 7 illustrates an example embodiment of a server cluster in accordance with example embodiments of the disclosure.

FIG. 7 illustrates an example embodiment of a server cluster in accordance with example embodiments of the disclosure. The server cluster 784 may include two servers 704-1 and 704-2, either of which may be implemented with, or may be used to implement, any of the servers disclosed herein such as the servers 104, 204, and/or 304 illustrated in FIG. 1, FIG. 2, and/or FIG. 3. For purposes of illustration, the embodiment illustrated in FIG. 7 may be described in the context of some specific implementation details, but the inventive principles are not limited to these or any other implementation details.

Referring to FIG. 7, the server cluster 784 may also include three dual-port NICs 771, 773, and 775, one or more peer-to-peer network connections 764 and/or 766, a target interface 756, a target interface subsystem 758, and/or a resource pool 760 that may include, for example, one or more resources 762 such as storage resources, compute resources, and/or the like.

In some embodiments, port 1 and port 2 of the first NIC 771 may provide access to one or more front-end networks and one or more back-end networks, respectively, for the first server 704-1. Similarly, port 1 and port 2 of the second NIC 773 may provide access to one or more front-end networks and one or more back-end networks, respectively, for the second server 704-2. In some embodiments, the one or more front-end networks may implement a network stack that may communicate with one or more clients (e.g., with HTTP, TCP, and/or the like, any type of object storage protocol, object storage service, remote procedure call for object storage, API service for objects, and/or the like (e.g., over HTTP, TCP, and/or the like)), whereas the one or more back-end networks may implement remote data transfer to memory using a memory access protocol (e.g., RDMA).

In some embodiments, the one or more back-end networks may enable servers 704-1 and/or 704-2 to access the resource pool 760, for example using the target interface 756 and/or target interface subsystem 758 which may be implemented, for example, using NVMe. In some embodiments, the one or more peer-to-peer network connections 764 and/or 766 may enable servers 704-1 and/or 704-2 to access resource pools at other server clusters, as well as enabling other server clusters to access the resource pool 760.

In some embodiments, the third NIC 775 may provide an additional network connection, for example, to enable the target interface 756 to implement remote data transfer to memory using a memory access protocol (e.g., RDMA) with one or more clients, for example, as described above with respect to FIG. 1, FIG. 2, and/or FIG. 3.

Figure 8:
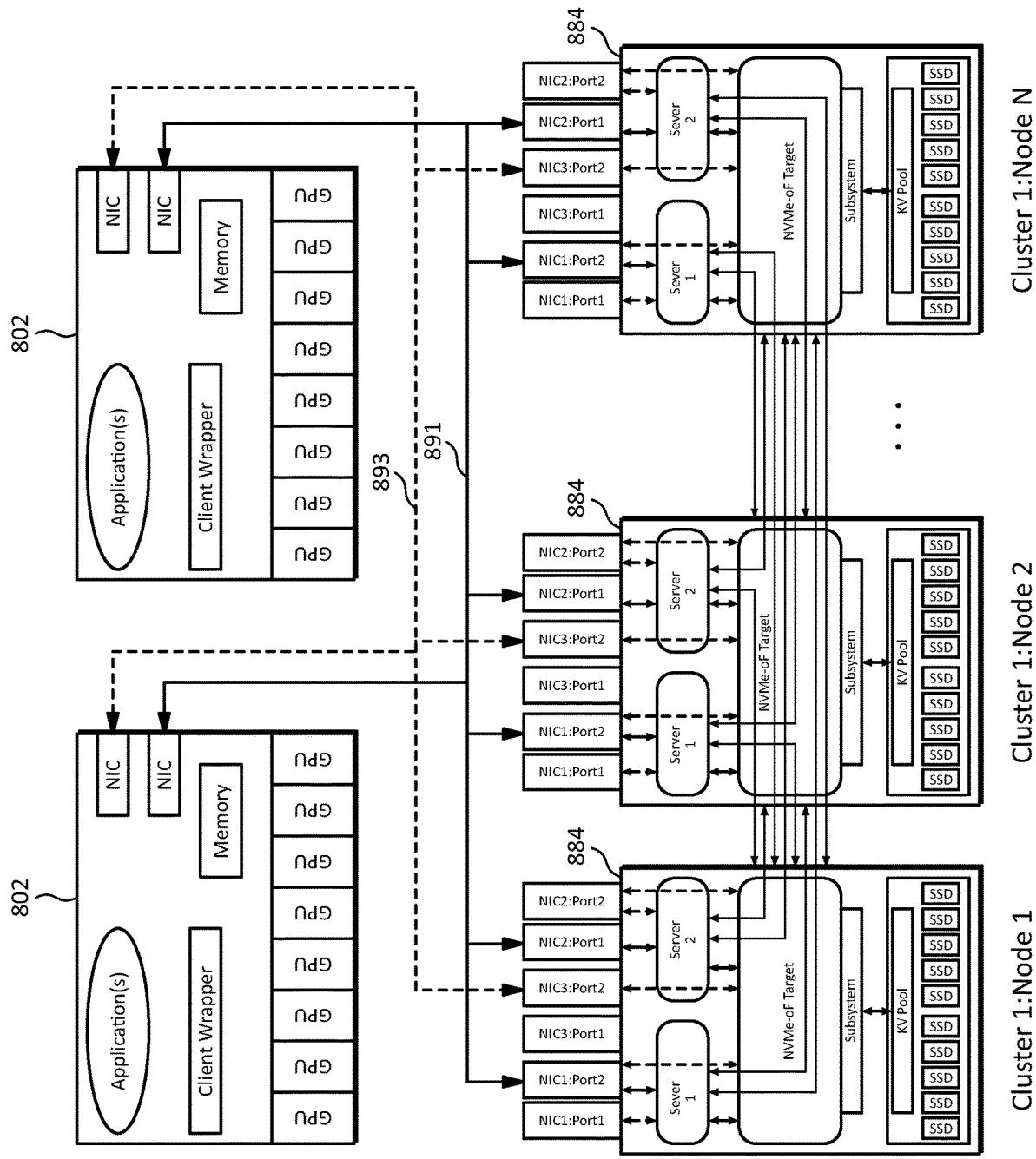
FIG. 8 illustrates an example embodiment of a system with remote data transfer to memory using a memory access protocol in accordance with example embodiments of the disclosure.

FIG. 8 illustrates an example embodiment of a system with remote data transfer to memory using a memory access protocol in accordance with example embodiments of the disclosure. The embodiment illustrated in FIG. 8 may include one or more clients 802 and one or more server clusters 884. In some embodiments, the one or more clients 802 may be implemented with one or more of the clients 602 illustrated in FIG. 6. In some embodiments, the one or more server clusters 884 may be implemented with one or more of the server clusters 784 illustrated in FIG. 7. For purposes of illustration, the embodiment illustrated in FIG. 8 may be described in the context of some specific implementation details such as resources implemented with a KV pool using solid state drives (SSDs) and/or network targets implemented with NVMe-oF, but the inventive principles are not limited to these or any other implementation details.

The embodiment illustrated in FIG. 8 may include a first network fabric 891 and a second network fabric 893. The first network fabric 891 may provide a first front-end network between one or more of the servers in the server clusters 884 and one or more of the clients 802. The first network fabric 891 may be implemented, for example, using one or more network stacks that may communicate using one or more relatively high overhead and/or latency protocols such as HTTP, TCP, and/or the like, any type of object storage protocol, object storage service, remote procedure call for object storage, API service for objects, and/or the like (e.g., over HTTP, TCP, and/or the like). In contrast, the second network fabric 893 may implement remote data transfer to memory using a memory access protocol (e.g., RDMA) that may have relatively low overhead, latency, and/or the like. In some embodiments, the second network fabric 893 may enable a network target (e.g., an NVMe-oF target in one or more of the server clusters 884) to transfer data from a KV pool (e.g., a KV store) directly to memory of one or more clients 802 in response to a command from a server.

In an embodiment in which one or more of the resources are implemented as one or more storage devices, a storage device may include any type of nonvolatile storage media based, for example, on solid state media (e.g., an SSD), magnetic media (e.g., a hard disk drive (HDD)), optical media, and/or the like, or any combination thereof. For example, in some embodiments, a storage device may be implemented as an SSD based on not-AND (NAND) flash memory, persistent memory such as cross-gridded nonvolatile memory, memory with bulk resistance change, phase change memory (PCM), and/or the like, or any combination thereof. Any such storage device may be implemented in any form factor such as 3.5 inch, 2.5 inch, 1.8 inch, M.2, Enterprise and Data Center SSD Form Factor (EDSFF), NF1, and/or the like, using any connector configuration such as SATA, SCSI, SAS, U.2, M.2, and/or the like. Any such storage device may be implemented entirely or partially with, and/or used in connection with, a server chassis, server rack, dataroom, datacenter, edge datacenter, mobile edge datacenter, and/or any combinations thereof.

Any of the functionality described herein, including any of the host functionality, client functionality (e.g., a client interface), server functionality, target functionality (e.g., a target interface and/or subsystem) and/or the like, may be implemented with hardware software or a combination therefore including combinational logic, sequential logic, one or more timers, counters, registers, and/or state machines, one or more CPLDs, FPGAs, ASICs, embedded processors, CPUs such as CISC processors such as x86 processors and/or RISC processors such as ARM processors, GPUs, NPUs, TPUs, and/or the like, executing instructions stored in any type of memory, or any combination thereof.

Figure 9:
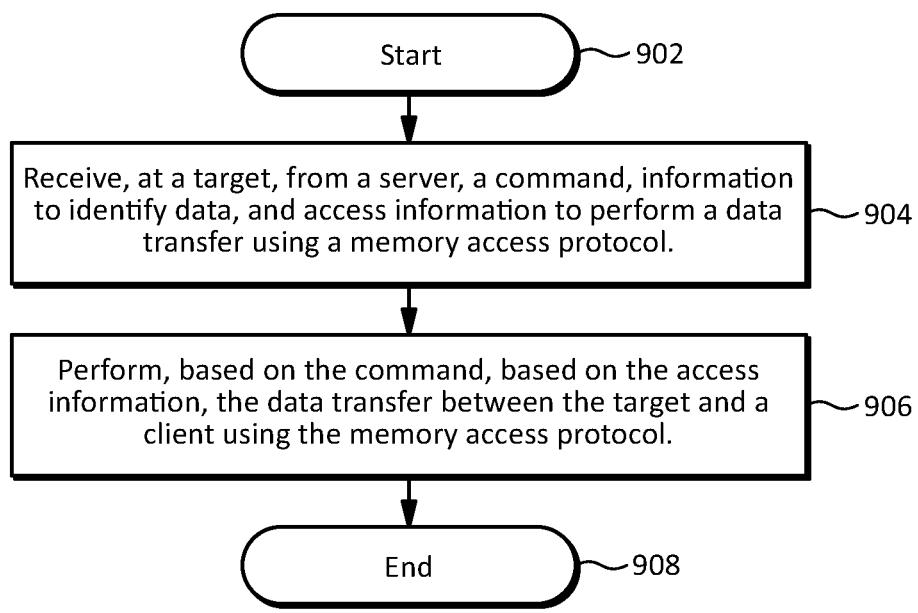

FIG. 9 illustrates an embodiment of a method for remote data transfer to memory using a memory access protocol in accordance with example embodiments of the disclosure. The method may start at operation 902. At operation 904, the method may receive, at a target, from a server, a command, information to identify data, and access information to perform a data transfer using a memory access protocol. For example, in some embodiments, the information to identify data may be implemented with an object key, and the access information may include RDMA information. At operation 906, the method may perform, based on the command, based on the access information, the data transfer between the target and a client using the memory access protocol. For example, in some embodiments, the target may transfer data to the client using RDMA, The method may end at operation 908.

The embodiments illustrated in FIG. 9, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," "access" may refer to "access at least in part," and/or the like. A reference to a first element may not imply the existence of a second element.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
   receiving, at a target, from a server using a first protocol, a data transfer command, information to identify data comprising an object key including a data length and a data start address of the data, and access information to perform a data transfer using a memory access protocol by the target; and
   performing, based on the data transfer command, based on the access information, the data transfer between the target and a client using the memory access protocol, wherein the access information includes a connection handle which is part of the memory access protocol, wherein the connection handle is for the data transfer between the target and the client and the first protocol is different from the memory access protocol, and wherein the object key and the access information are encoded, at least partially, in an encoded object key, and the encoded object key is decoded at the target, at least partially to extract the connection handle.

2. The method of claim 1, further comprising sending, based on the data transfer, between the target and the server, a completion.

3. The method of claim 2, further comprising sending, based on the completion, from the server to the client, an indication of success.

4. The method of claim 1, wherein the target is a first target, the data transfer command is a first command, the information to identify data is first information to identify first data, the access information is first access information, and the data transfer is a first data transfer and includes a direct transfer of a payload between the first target and the client, the method further comprising:
   receiving, at the target, from the server, a second command, second information to identify second data, and second access information to perform a second data transfer using the memory access protocol;
   obtaining, based on the second information to identify the second data, the second data; and
   performing, based on the second command, based on the second access information, the second data transfer between the target and the client using the memory access protocol.

5. The method of claim 4, further comprising:
   sending, based on the first data transfer, from the target to the server, a first completion;
   sending, based on the second data transfer, from the target to the server, a second completion; and
   sending, based on the first completion and the second completion, from the server to the client, an indication of success.

6. The method of claim 1, wherein the data is configured for error correction.

7. The method of claim 1, wherein the data transfer is a first data transfer, and the target is one of one or more targets, the method further comprising:
   determining a status of the first data transfer; and
   performing a second data transfer, based on the status, between the client and one of the one or more targets, of parity data using the memory access protocol.

8. The method of claim 7, further comprising reconstructing the data based on the parity data.

9. The method of claim 8, wherein the reconstructing is performed at the client.

10. The method of claim 1, further comprising initializing a connection, between the client and the target, for the memory access protocol.

11. The method of claim 10, further comprising:
    sending, from the server to the client, configuration information for the target, wherein the connection is based on the configuration information.

12. The method of claim 1, wherein the performing the data transfer comprises transferring the data from the target to the client.

13. The method of claim 1, wherein the performing the data transfer comprises transferring the data from the client to the target.

14. A system comprising:
    a target configured to:
      receive, using a first network path with a first protocol, a data transfer command, information to identify data comprising an object key including a data length and a data start address of the data, and access information; and
      perform, based on the data transfer command and based on the access information, using a second network path, using a memory access protocol, a transfer of the data, wherein the access information includes a connection handle which is part of the memory access protocol and the target is a memory, wherein the connection handle is for the transfer of data between the target and client and the first protocol is different from the memory access protocol, and wherein the object key and the access information are encoded, at least partially, in an encoded object key, and the encoded object key is decoded at the target, at least partially to extract the connection handle.

15. The system of claim 14, further comprising a server configured to:
    receive, using a third network path, a request; and
    send, to the target, based on the request, using the first network path, the data transfer command.

16. The system of claim 15, further comprising a client configured to:
    send, to the server, using the third network path, the request; and
    perform, using the second network path, using the memory access protocol, the transfer of data.

17. An apparatus comprising:
    a target interface; and
    one or more network interfaces configured to connect the target interface to a first network path and a second network path;

wherein the target interface is configured to:
receive, using the first network path with a first protocol, a data transfer command, information to identify data comprising an object key including a data length and a data start address of the data, and access information; and perform a data transfer on the data, based on the data transfer command and based on the access information, using the second network path, using a memory access protocol, wherein the access information includes a connection handle which is part of the memory access protocol for the data transfer between the target interface and a client interface and the first protocol is different from the memory access protocol, and the target interface is a memory interface, and wherein the object key and the access information are encoded, at least partially, in an encoded object key, and the encoded object key is decoded at the target, at least partially to extract the connection handle.

18. The apparatus of claim 17, wherein the target interface is configured to initialize a connection for the memory access protocol for the second network path.

19. The apparatus of claim 17, further comprising one or more resources, wherein the target interface is configured to provide access, using the second network path, using the memory access protocol, to the one or more resources.

* * * * *